United States Patent
Noda (10) Patent No.: US 11,341,404 B2
(45) Date of Patent: May 24, 2022

(54) ANALYSIS-DATA ANALYZING DEVICE AND ANALYSIS-DATA ANALYZING METHOD THAT CALCULATES OR UPDATES A DEGREE OF USEFULNESS OF EACH DIMENSION OF AN INPUT IN A MACHINE-LEARNING MODEL

(71) Applicant: SHIMADZU CORPORATION, Kyoto (JP)

(72) Inventor: Akira Noda, Nara (JP)

(73) Assignee: SHIMADZU CORPORATION, Kyoto (JP)

( * ) Notice: Subject to any disclaimer, the term of this patent is extended or adjusted under 35 U.S.C. 154(b) by 964 days.

(21) Appl. No.: 15/921,107

(22) Filed: Mar. 14, 2018

(65) Prior Publication Data

US 2018/0268293 A1    Sep. 20, 2018

(30) Foreign Application Priority Data

Mar. 15, 2017   (JP) .............................. JP2017-049391

(51) Int. Cl.
*G06N 3/04*     (2006.01)
*G06N 3/08*     (2006.01)
(Continued)

(52) U.S. Cl.
CPC ............... *G06N 3/08* (2013.01); *G06F 17/18* (2013.01); *G06K 9/00536* (2013.01);
(Continued)

(58) Field of Classification Search
CPC .......... G06N 3/02; G06N 3/082; G06N 20/00; G06N 3/0436; G06N 3/08; G06N 5/048; G06N 7/08; G06F 17/18
See application file for complete search history.

(56) References Cited

U.S. PATENT DOCUMENTS 10,515,312 B1 *  12/2019  Kubo ..................... G06N 3/084
2016/0335540 A1 *  11/2016  Hinton .................. G06N 3/082

FOREIGN PATENT DOCUMENTS

WO    2014/105866 A1    7/2014
WO    2018/025361 A1    2/2018

OTHER PUBLICATIONS

Zhuo, Jingwei, Jun Zhu, and Bo Zhang. "Adaptive Dropout Rates for Learning with Corrupted Features." IJCAI. 2015. (Year: 2015).*

(Continued)

*Primary Examiner* — Benjamin P Geib
(74) *Attorney, Agent, or Firm* — Sughrue Mion, PLLC (57) ABSTRACT

Using training data, machine learning is performed to construct a learning model which is a non-linear function for discrimination or regression analysis (S2). A degree of contribution of each input dimension is calculated from a partial differential value of that function. Input dimensions to be invalidated are determined using a threshold defined by a Gaussian distribution function based on the degrees of contribution (S3-S5). Machine learning is once more performed using the training data with the partially-invalidated input dimensions (S6). A new value of the degree of contribution of each input dimension is determined from the obtained learning model, and the degree of contribution is updated using the old and new values (S7-S8). After the processes of Steps S5-S8 are iterated a specified number of times (S9), useful dimensions are determined based on the finally obtained degrees of contribution, and the machine-learning model is constructed (S10).

5 Claims, 5 Drawing Sheets (51) Int. Cl.
  *G06N 5/04*   (2006.01)
  *G06N 7/00*   (2006.01)
  *G06N 7/08*   (2006.01)
  *G06N 20/10*  (2019.01)
  *G06F 17/18*  (2006.01)
  *G06K 9/00*   (2022.01)
  *G01N 30/86*  (2006.01)

(52) U.S. Cl.
  CPC ........... *G06N 3/0436* (2013.01); *G06N 3/084* (2013.01); *G06N 5/048* (2013.01); *G06N 7/005* (2013.01); *G06N 7/08* (2013.01); *G06N 20/10* (2019.01); *G01N 30/86* (2013.01)

(56) References Cited

OTHER PUBLICATIONS

Srivastava, Nitish, et al. "Dropout: a simple way to prevent neural networks from overfitting." The journal of machine learning research 15.1 (2014): 1929-1958. (Year: 2014).*
Karen Simonyan et al., "Deep Inside Convolutional Networks: Visualising Image Classification Models and Saliency Maps," Cornell University Library, accessed on Mar. 10, 2017, the Internet, pp. 1-8.
Robert Tibshirani, "Regression Shrinkage and Selection via the Lasso," Journal of the Royal Statistical Society Series B (Methodological), 1996, pp. 267-288, vol. 58, No. 1.

\* cited by examiner

MASS SPECTRUM
OF sample 1

LABEL
CANCEROUS: 1
NON-CANCEROUS: 0

| m/z | 100.1 | 101.8 | 102.5 | 104.7 | ------ | |
|---|---|---|---|---|---|---|
| sample 1 | 102 | 41 | 75 | 68 | ------ | 1 |
| sample 2 | 30 | 12 | 21 | 98 | ------ | 1 |
| sample 3 | 25 | 507 | 22 | 607 | ------ | 1 |
| ⋮ | ⋮ | ⋮ | ⋮ | ⋮ | | ⋮ |
| sample n-1 | 78 | 32 | 58 | 206 | ------ | 0 |
| sample n | 65 | 68 | 86 | 307 | ------ | 0 |
| ⋮ | ⋮ | ⋮ | ⋮ | ⋮ | | ⋮ |
| sample N | 5 | 25 | 54 | 127 | | 0 |

ANALYSIS-DATA ANALYZING DEVICE AND ANALYSIS-DATA ANALYZING METHOD THAT CALCULATES OR UPDATES A DEGREE OF USEFULNESS OF EACH DIMENSION OF AN INPUT IN A MACHINE-LEARNING MODEL

TECHNICAL FIELD

The present invention relates to an analysis-data analyzing device and method for analyzing data obtained with various kinds of analyzing apparatuses, such as a mass spectrometer, gas chromatograph (GC), liquid chromatograph (LC), spectrophotometer, fluorescent X-ray analyzer, or nuclear magnetic resonator (NMR). More specifically, it relates to an analysis-data analyzing device and method utilizing the supervised learning, which is one type of machine-learning technique. Although it may be common to use the term "machine learning" exclusive of multivariate analysis, there is practically no defined border between machine learning and multivariate analysis. Multivariate analysis is often discussed as a part of the machine learning. Accordingly, the term "machine learning" in the present description should be interpreted as inclusive of multivariate analysis.

BACKGROUND ART

Machine learning is one of the useful techniques for discovering a certain regularity in a wide variety and huge amount of data, and for using the regularity to perform a prediction, discrimination or regression of data. In recent years, machine learning has been applied in an increasing number of areas. Typical and commonly known techniques of the machine learning include: support vector machine (SVM), neural network, random forest, AdaBoost, and deep learning. Typical and commonly known techniques of the multivariate analysis which is categorized as machine learning in a broad sense include: principal component analysis (PCA), independent component analysis (ICA), and partial least squares (PLS) (for example, see Patent Literature 1).

Machine learning can be roughly divided into two types: supervised learning and unsupervised learning. For example, consider the case of discriminating between the presence and absence of a specific disease based on a set of data obtained for a subject using an analyzing apparatus. If a large number of samples of data can be collected beforehand for patients affected with that disease as well as for unaffected individuals, supervised learning can be performed using the collected data as the training data. In recent years, attempts have been made by many researchers to diagnose cancers or other specific diseases by applying supervised learning in an analysis of mass spectrum data obtained with a mass spectrometer.

Figure 9:
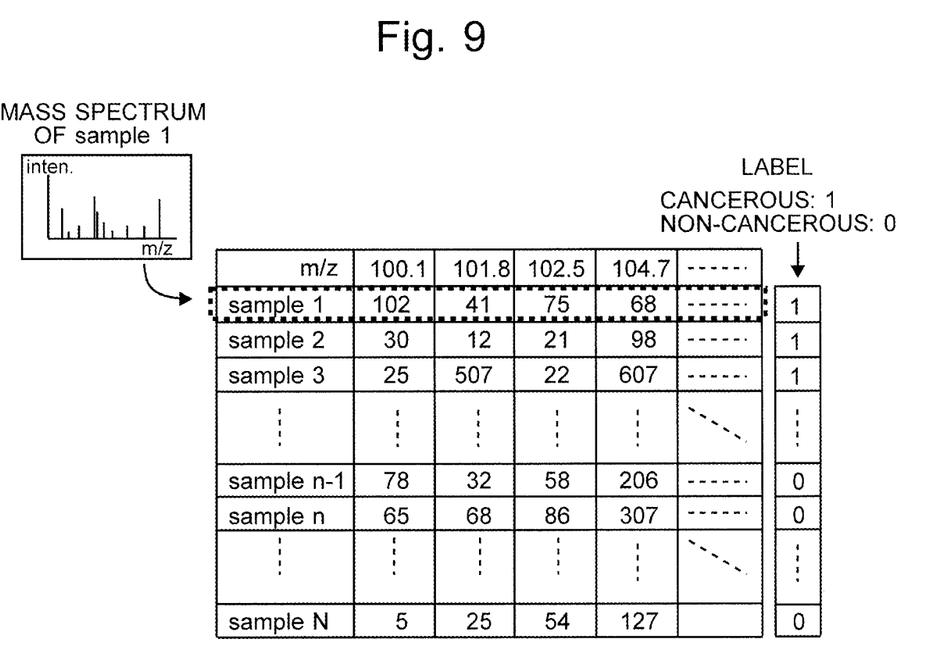
FIG. 9 is a diagram showing one example of the peak matrix in which mass spectrum data for cancerous and non-cancerous specimens are organized as the training data.

FIG. 9 is one example of the peak matrix in which mass spectrum data for cancerous and non-cancerous specimens are organized as the training data.

This peak matrix shows signal intensity values of mass peaks as its elements, with each row corresponding to a sample and each column corresponding to a peak position (mass-to-charge ratio m/z). In other words, the elements in each row of this peak matrix show the signal intensity values of the peaks at relevant mass-to-charge ratios for one sample, while the elements in each column show the signal intensity values at one mass-to-charge ratio for all samples. In the present example, samples 1 through n−2 are cancerous specimens and labeled with a value of "1" which indicates that the sample is cancerous. Samples n−1 through N are non-cancerous specimens and labeled with a value of "0" which indicates that the sample is non-cancerous. The label in the present case is a binary label. By using such a set of labelled training data, it is possible to construct a machine-learning model which enables high-reliability discrimination between cancerous and non-cancerous samples.

Mass spectrum data organized in the previously described form can be considered as multidimensional data by regarding each mass-to-charge-ratio value as one dimension. Mass spectrum data obtained from a biological sample contain information originating from various substances which are commonly found in living organisms. Therefore, in normal cases, the number of peaks is extremely large. This means that such data are multidimensional data which have an extremely large number of dimensions. Meanwhile, marker peaks which are useful for discriminating a specific disease, such as a cancer, are far fewer. In other words, only a small number of dimensions are useful for discriminating a specific disease. Information in many other dimensions can be considered as unnecessary for the purpose of discriminating that specific disease.

A problem in the machine learning is that the discriminating or regressing performance deteriorates due to the overtraining (also called the overfitting). It has been commonly known that the use of training data which have unnecessary dimensions as mentioned earlier is one cause of the overtraining, and information in such dimensions has adverse effects on the discrimination or regression in the machine learning (for example, see Non Patent Literature 1).

One method for preventing the overtraining is to perform the learning using, as the training data, mass spectrum data which contain such a wide variety of patterns that the peaks originating from substances which are unrelated to the case to be discriminated or regressed (e.g. the discrimination between cancerous and non-cancerous samples), as well as the peaks originating from substances which show a false-positive correlation with the aforementioned case, will be as ignorable as random noise. This requires a huge number of samples to be prepared. However, in the case of discriminating a cancer or similar disease, only a limited amount of data can be collected beforehand, so that the aforementioned method is impractical.

Non Patent Literature 1 discloses another technique for preventing the overtraining due to unnecessary dimensions. In this technique, any dimension having a small coefficient in a discrimination function or regression function obtained by the machine learning is regarded as less useful, and information in such a dimension is set to zero by using a normalization term. In machine learning, it is common to make such an attempt to reduce the influences of the unnecessary dimensions by assessing the degree of usefulness of each input dimension and multiplying the input by a weighting factor according to its degree of usefulness.

However, such a technique is unlikely to produce a satisfactory effect if there is not a certain number of samples in training data, because the use of training data which include an insufficient number of samples may result in a low accuracy of the discrimination function or regression function initially obtained by the machine learning, making it difficult to find useful dimensions. In practice, when the target sample is a biological sample, the number of samples in the training data is often insufficient as compared to the number of substances contained in the target sample or the variety of the composition ratio of those substances, i.e. the diversity of the data. In such a case, it is not guaranteed that useful dimensions will be correctly extracted. That is to say, unnecessary dimensions may be mixed in the input, or some actually useful dimensions may be missed, preventing the discrimination analysis or regression analysis from showing high performance.

CITATION LIST

Patent Literature

Patent Literature 1: WO 2014/105866 A1

Non Patent Literature

Non Patent Literature 1: Robert Tibshirani, "Regression Shrinkage and Selection via the Lasso", *Journal of the Royal Statistical Society. Series B (Methodological)*, Vol. 58, No. 1, 1996, pp. 267-288

Non Patent Literature 2: Karen Simonyan and two other authors, "Deep Inside Convolutional Networks: Visualising Image Classification Models and Saliency Maps", Cornell University Library, [accessed on Mar. 10, 2017], the Internet

SUMMARY OF INVENTION

Technical Problem

The present invention has been developed to solve the previously described problem. Its objective is to provide an analysis-data analyzing device and analysis-data analyzing method which can construct a machine-learning model by selecting useful dimensions for a discrimination analysis or regression analysis while deleting unnecessary dimensions which cause the overtraining, even when the number of samples in the training data is comparatively small.

Solution to Problem

One aspect of the present invention developed for solving the previously described problem is an analysis-data analyzing device for analyzing multidimensional analysis data obtained for a plurality of samples by an analyzing apparatus and showing a signal value in each of a plurality of different dimensions, the analysis-data analyzing device configured to construct a machine-learning model based on training data which are analysis data for a plurality of samples, and to perform a discrimination analysis or regression analysis for an unknown sample using the machine-learning model, and the analysis-data analyzing device including:

a) a model creator for performing machine learning for a given set of training data to create a machine-learning model for a discrimination analysis or regression analysis;

b) a usefulness degree calculator for calculating a degree of usefulness of an input in each of the dimensions in the machine-learning model created by the model creator, or for updating the degree of usefulness using a newly determined degree of usefulness if the degree of usefulness already exists;

c) an input invalidator for stochastically invalidating the input in a portion of the dimensions according to the degree of usefulness of each of the dimensions calculated by the usefulness degree calculator;

d) an iteration execution controller for controlling the model creator, the usefulness degree calculator and the input invalidator so as to execute, one or more times, a sequential operation of performing the machine learning by the model creator using the training data after an invalidation of the input in a portion of the dimensions by the input invalidator, and then updating the degree of usefulness of the input in each of the dimensions based on the result of the machine learning; and e) a dimension determiner for selecting or weighting the dimensions to be used in the discrimination analysis or regression analysis for an unknown sample, based on the degree of usefulness of each of the dimensions after the sequential operation is iterated one or more times by the iteration execution controller.

Another aspect of the present invention developed for solving the previously described problem is an analysis-data analyzing method for analyzing multidimensional analysis data obtained for a plurality of samples by an analyzing apparatus and showing a signal value in each of a plurality of different dimensions, the analysis-data analyzing method configured to construct a machine-learning model based on training data which are analysis data for a plurality of samples, and to perform a discrimination analysis or regression analysis for an unknown sample using the machine-learning model, and the analysis-data analyzing method including:

a) a model creation step, in which machine learning for a given set of training data is performed to create a machine-learning model for a discrimination analysis or regression analysis;

b) a usefulness degree calculation step, in which a degree of usefulness of an input in each of the dimensions in the machine-learning model created in the model creation step is calculated, and the degree of usefulness is updated using a newly determined degree of usefulness if the degree of usefulness already exists; and c) an input invalidation step, in which the input in a portion of the dimensions is stochastically invalidated according to the degree of usefulness of each of the dimensions calculated in the usefulness degree calculation step, and a sequential operation of performing once more the machine learning in the model creating step using the training data after an invalidation of the input in a portion of the dimensions in the input invalidation step, and then updating the degree of usefulness of the input in each of the dimensions based on the result of the machine learning, is iterated one or more times, and subsequently, the dimensions to be used in the discrimination analysis or regression analysis for an unknown sample are selected or weighted based on the degree of usefulness of each of the dimensions obtained through the iteration of the sequential operation.

In the analysis-data analyzing device and method according to the present invention, the "machine learning" includes multivariate analyses in which the so-called "supervised learning" is performed. There is no specific limitation on the kind of analyzing apparatus as well as the kind of data to be analyzed. Specific examples include mass spectrum data obtained with a mass spectrometer, chromatogram data obtained with a gas chromatograph or liquid chromatograph, and absorption spectrum data obtained with a spectrophotometer. Needless to say, the present invention can also be applied to many kinds of data obtained with various other analytical techniques.

If the data to be analyzed are mass spectrum data, for example, each mass-to-charge ratio at which a mass peak is located corresponds to one dimension. If the data to be analyzed are chromatogram data, for example, each retention time at which a chromatogram peak is located corresponds to one dimension. If the data to be analyzed are absorption spectrum data, for example, each wavelength at which an absorption peak is located corresponds to one dimension.

There is no specific limitation on the technique of the machine learning used in the analysis-data analyzing device and method according to the present invention as long as the discrimination analysis or regression analysis is performed by supervised learning. Examples of such techniques include: neural network, support vector machine, random forest, deep learning, linear discrimination, non-linear discrimination, principal component analysis, independent component analysis, and partial least squares. It is preferable to select an appropriate kind of technique according to the kind, nature and other aspects of the analysis data to be analyzed.

In the analysis-data analyzing device according to the present invention, when a set of training data are given to the device, the model creator performs machine learning using the training data to create a machine-learning model for a discrimination analysis or regression analysis. For example, this machine-learning model is a function for the discrimination analysis or regression analysis expressing the relationship between multidimensional inputs and an output. Subsequently, the usefulness degree calculator computes an index value which indicates the degree of usefulness of the input in each of the dimensions in relation to the created machine-learning model. For example, the "degree of contribution" used in a technique proposed in the International Publication No. WO 2018/025361 A1 can be used as the "index value showing the degree of usefulness of the input in each of the dimensions". This prior application, filed by the present applicant in advance of the present application, pertains to a novel technique for preventing the overtraining due to unnecessary dimensions in machine learning.

That is to say, in a discrimination analysis or regression analysis which uses a non-linear function in machine learning (e.g. neural network), correlation coefficients cannot be calculated as in a linear discrimination analysis. However, according to Non Patent Literature 2, the degree of contribution of each dimension of the input to the output can be calculated by partial differentiation. Although the method described in Non Patent Literature 2 uses a sigmoid function in a non-linear discrimination analysis or regression analysis employing a neural network, the idea is not limited to the case of using a sigmoid function. Since most of the learning methods which use neural networks are categorized as the gradient method, it is possible to calculate a partial differential value (or partial subdifferential value) at each data point in the non-linear function for the discrimination analysis or regression analysis. A discrimination analysis or regression analysis by machine learning using a support vector machine similarly allows for the calculation of a partial differential value, or the calculation of a change in the output for a minimal change in the input as a value corresponding to the partial differential value, if both input and output have continuous values. As long as a partial differential value or a value which corresponds to the partial differential value at each data point can be calculated, it is possible to calculate the degree of contribution from that value.

In accordance with, for example, the degree of contribution calculated for each input dimension in the previously described manner, the input invalidator stochastically invalidates the input in a portion of the dimensions so that an input dimension which is expected to be lower in degree of contribution and therefore lower in usefulness will be invalidated with a higher probability. The reason why the dimensions to be invalidated are stochastically determined is because the values of the degree of contribution are not completely reliable, or because a dimension having a comparatively high degree of contribution does not always contribute to an improvement in the performance of the discrimination analysis or regression analysis, or for other reasons. The "invalidation" of an input means replacing the input value with a value that has no effective influence on the learning. A typical operation is to replace all input values in a portion of the dimensions by zero. It is also possible to replace them with an average of all input values of the dimensions concerned, or with random numbers.

Subsequently, under the control of the iteration execution controller, the model creator once more performs the machine learning, using the training data in which the input in a portion of the dimensions has been invalidated, to determine the machine-learning model. The usefulness degree calculator computes the index value which indicates the degree of usefulness of each dimension in relation to the new machine-learning model, and then updates each index value, for example, by calculating a weighted average using the new index value and the previously obtained one. Such a sequential operation is iterated one or more times under the control of the iteration execution controller.

Although all the dimensions of the inputs invalidated by the input invalidator do not always have low degrees of usefulness, it is certain that those input dimensions are likely to have low degrees of usefulness. Therefore, with the iteration of the previously described sequential operation, an input dimension which truly has a high degree of usefulness will be gradually higher in the index value which indicates the degree of usefulness, and conversely, an input dimension which truly has a low degree of usefulness will be gradually lower in the index value which indicates the degree of usefulness. That is to say, the reliability of the index value which indicates the degree of usefulness improves. After the iteration of the previously described sequential operation, the dimension determiner determines which dimensions should be used for the discrimination analysis or regression analysis for an unknown sample, based on the index value which indicates the degree of usefulness of each input dimension. This may be achieved by simply selecting the input dimensions to be used and excluding other unnecessary dimensions, or by effectively selecting input dimensions to be used by assigning them weighting factors in such a manner that the inputs of the dimensions to be used are given greater weighting factors than those given to the unnecessary dimensions. The criterion for determining the dimensions can be empirically set by users or device manufacturers. As one possible example of the criterion, a predetermined number of input dimensions may be selected in descending order of the index value showing the degree of contribution or the like.

In the analysis-data analyzing device according to the present invention, one preferable method for the input invalidator to stochastically invalidate the input in a portion of the dimensions according to the degree of usefulness of each of the dimensions is to determine a probability distribution function using an average value and standard deviation of the index value which indicates the degree of usefulness of each dimension, and judge the index value which indicates the degree of usefulness of each dimension, with reference to a threshold value stochastically determined based on the probability distribution function. Various distribution functions are available as the probability distribution function. Typically, a Gaussian distribution function may be used.

What kind of probability distribution function is appropriate depends on the nature, number (of dimensions) and other aspects of the data to be analyzed. Accordingly, it is preferable to previously determine an appropriate probability distribution function according to the relevant factors, such as the kind of data for which the present device is used.

The analysis-data analyzing device and method according to the present invention has no specific limitation on the technique for determining the degree of usefulness of the input dimension. It is therefore evident that the present invention can be combined with not only the technique proposed by the present applicant in the aforementioned International Application No. PCT/JP2006/072873, but also with the technique of extracting the degree of usefulness of the input dimension described in Non Patent Literature 1. Even in the latter case, the degree of usefulness of the input dimension can be determined with a high degree of reliability.

Advantageous Effects of the Invention

With the analysis-data analyzing device and method according to the present invention, the input dimensions which are highly useful for a discrimination analysis or regression analysis can be selected with high reliability even when the number of samples in the training data is comparatively small. Unnecessary input dimensions which will cause overtraining can be thereby properly deleted, and a machine-learning model which enables a high-performance discrimination analysis or regression analysis can be constructed.

DESCRIPTION OF EMBODIMENTS

One embodiment of a disease discrimination device using an analysis-data analyzing device according to the present invention is hereinafter described with reference to the attached drawings.

Figure 1:
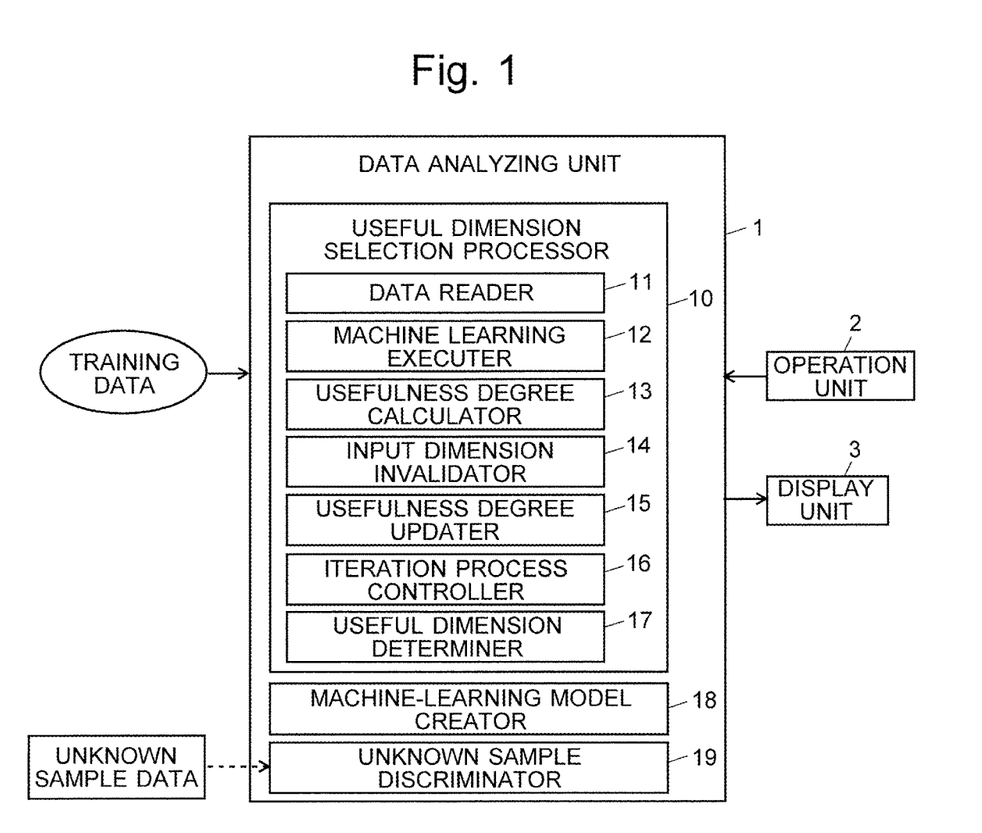
FIG. 1 is a schematic block diagram showing the configuration of a disease discrimination device in the embodiment.

FIG. 1 is a schematic block diagram showing the configuration of the disease discrimination device in the present embodiment.

This disease discrimination device is a device which receives an input of unknown sample data which are mass spectrum data obtained by a mass spectrometric analysis performed on a biological sample originating from a subject using a mass spectrometer (not shown), and analyzes the input data to determine whether or not the sample is affected with a specific disease (in the present embodiment, whether nor not the sample is cancerous or non-cancerous). This disease discrimination device includes a data analyzing unit 1 as well as an operation unit 2 and display unit 3 which function as the user interface.

The data analyzing unit 1 includes a useful dimension selection processor 10, machine-learning model creator 18, and unknown data discriminator 19 as its functional blocks. The useful dimension selection processor 10 include a data reader 11, machine learning executer 12, usefulness degree calculator 13, input dimension invalidator 14, usefulness degree updater 15, iteration process controller 16, and useful dimension determiner 17 as its functional blocks.

Although the functional blocks in the data analyzing unit 1 may be constructed in the form of respective dedicated hardware blocks, it is practically preferable to embody those functional blocks by using a personal computer, workstation (which is higher in performance) or similar device as a hardware resource and executing, on the computer, a piece of dedicated software (computer program) previously installed on the same computer.

In the disease discrimination device in the present embodiment, the data analyzing unit 1 is previously given a set of training data which are a collection of mass spectrum data (which show the peak intensity signal for each mass-to-charge ratio at which a peak is present) derived from a large number of samples each of which has been labelled as "cancerous" or "non-cancerous" (i.e. which are known samples) as shown in FIG. 9. Each mass-to-charge ratio in those mass spectrum data corresponds to one different input dimension. For example, if there are 1000 peaks, the number of dimensions of the input is 1000. The input value (signal value) in each input dimension is an intensity value of a peak.

The useful dimension selection processor 10 selects dimensions which are useful for the discrimination of a disease by characteristic processing (which will be described later).

The machine-learning model creator 18 constructs a machine-learning model using only the data of the dimensions selected as useful dimensions from the given training data. Using the machine-learning model constructed by the machine-learning model creator 18, the unknown data discriminator 19 judges mass spectrum data derived from an unknown sample and labels the unknown sample as either cancerous or non-cancerous. The result of this discrimination is presented through the display unit 3.

Figure 3:
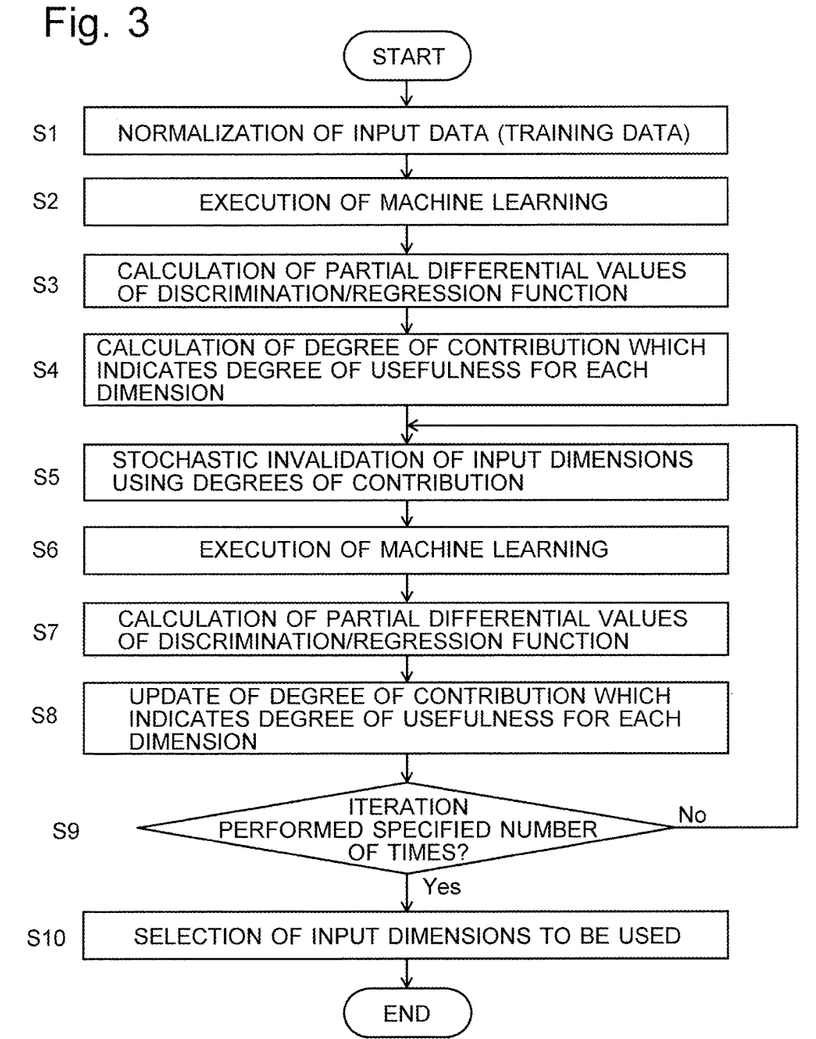
FIG. 3 is a flowchart of a useful dimension selection process in the disease discrimination device in the embodiment.

Next, a useful dimension selection process performed in the useful dimension selection processor 10 is described according to the flowchart shown in FIG. 3. For the present description, the technique proposed in the International Publication No. WO 2018/025361 A1 mentioned earlier is used as the technique for the machine learning. The available techniques are not limited to this one. For example, the method described in Non Patent Literature 1 may also be used.

It is often the case that training data vary in the detection sensitivity at which the data have been obtained. This problem is not serious in the case of using training data which have been entirely obtained using the same mass spectrometer but should be considered in the case of using training data obtained using two or more different mass spectrometers. Accordingly, when reading mass spectrum data given as the training data, the data reader 11 normalizes the data, for example, in such a manner that different sets of mass spectrum data will have the same standard deviation of the signal value in each input dimension (Step S1). Various commonly known methods can be used for the normalization. For example, the signal values at each mass-to-charge ratio included in the mass spectrum data may be divided by their standard deviation. The normalized training data are hereinafter simply called the training data.

Using the given training data, the machine learning executer 12 performs machine learning based on a non-linear discrimination analysis or regression analysis according to a predetermined algorithm to construct a machine-learning model (Step S2). For example, a neural network or support vector machine may specifically be used for the machine learning, although the available techniques are not limited to them. In the case of using an algorithm for a non-linear discrimination analysis or regression analysis, the machine learning model to be obtained is a function for the discrimination analysis or regression analysis reflecting the training data.

Subsequently, the usefulness degree calculator 13 computes, for each input dimension, a partial differential value of the non-linear function for the discrimination analysis or regression analysis determined in Step S2, in order to calculate the index value which indicates the degree of usefulness of each input dimension (Step S3). For example, a technique described in Non Patent Literature 2 can be used for the partial differentiation. In this technique, an input value to a softmax function is regarded as the output value of the function which is partially differentiated.

Then, using the partial differential value calculated for each input dimension in Step S3, the degree of contribution of each input dimension is calculated (Step S4). In the case of searching a mass spectrum for a biomarker used for determining whether or not the subject is affected with a specific disease as in the present embodiment, what is important is to determine how much the signal intensity value in a specific input dimension (i.e. at a specific mass-to-charge-ratio value) is deviated from the correct value. That is to say, it is important is to find an input dimension in which the signal intensity value shows a greater deviation from the correct value with an increase in the probability of the subject's being affected with the specific disease. In such a case, since the partial differential value appears with both positive and negative signs, the degree of contribution can be calculated based on the quadratic norm of the partial differential value.

Next, the input dimension invalidator 14 calculates the average value $\mu$ and standard deviation $\sigma$ of the degrees of contribution determined for each input dimension in Step S4. Then, for each dimension, the input dimension invalidator 14 stochastically determines a threshold for the invalidation of the dimension, based on a random-number distribution determined using the mean value $\mu$ and standard deviation $\sigma$. In the present embodiment, for example, if the degree of contribution shows a distribution as indicated by the solid line in FIG. 4 with mean value g and standard deviation $\sigma$, the random-number distribution is defined as a Gaussian distribution function having a central value of $\mu-0.5\sigma$ and a standard deviation of $2\sigma$ on both sides, as indicated by the alternate long and short dash line in FIG. 4. Then, the degree of contribution of each input dimension is compared with the threshold based on the Gaussian distribution function determined in the aforementioned manner. If the degree of contribution is not higher than the threshold, the input dimension is considered as unnecessary and this input is given a weighting factor of zero. It should be noted that this input invalidation is a temporary one. Needless to say, the invalidation may be performed in any form as long as the input values concerned are replaced with data which are effectively of no significance to the machine learning. For example, all input signals in the dimension concerned may be replaced by an average value of those input signals, by random numbers, or by a constant value different from zero, instead of giving a weighting factor of zero.

Figure 4:
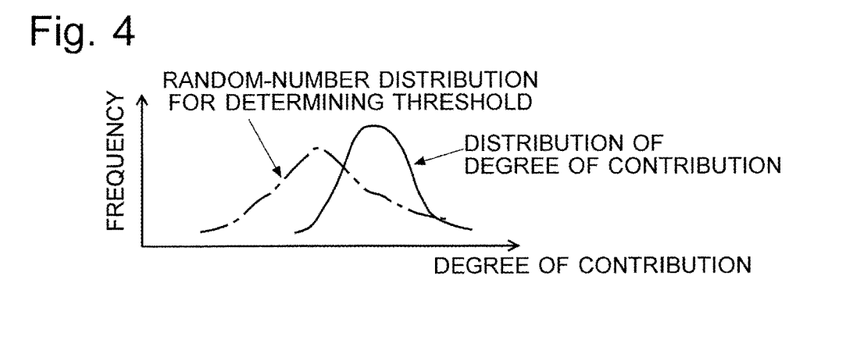
FIG. 4 is a model diagram showing one example of the degree-of-usefulness distribution obtained in the disease discrimination device according to the embodiment, as well as the random-number distribution for determining a threshold, derived from the degree-of-usefulness distribution.

It is preferable to appropriately adjust the parameters for defining the Gaussian distribution function which determines the threshold of the degree of contribution, i.e. the central value and standard deviation (or variance) of the distribution function, according to the expected number of peaks (i.e. the number of dimensions) and/or other factors. An appropriate kind of distribution function other than the Gaussian distribution function may also be used.

After a portion of the input dimensions have been invalidated in Step S5, the machine learning executer 12 under the control of the iteration process controller 16 once more performs the machine learning using the training data in which a portion of the input dimensions have been invalidated (i.e. in which the input dimensions have been multiplied by the weighting factors determined in the previously described manner), to construct a machine-learning model (Step S6). The process in Step S6 is the same as the process in Step S2 except that the input data have been modified. Then, in a similar manner to Step S3, the usefulness degree calculator 13 calculates the partial differential value of the non-linear function for the discrimination analysis or regression analysis determined in Step S6 (Step S7).

Next, similarly to Step S4, the usefulness degree updater 15 determines a new value of the degree of contribution for each input dimension based on the partial differential values calculated in Step S7 and updates the degree of contribution based on the newly determined values and the older values obtained in the previous processing cycle (Step S8). For example, the new and old values of the degree of contribution may be respectively multiplied by appropriate weighting factors to calculate their (weighted) average. In the present embodiment, a logarithm of the weighting factor is determined for each of the new and old values of the degree of contribution, and an average of the logarithms is calculated.

After the degrees of contribution which indicate the degrees of usefulness of the input dimensions have been updated, the iteration process controller 16 determines whether or not the number of iterations of the process has reached the specified number (Step S9). If the specified number has not yet been reached, the operation returns to Step S5 to repeat the processes of Steps S5 through S9. In normal cases, this specified number is a considerably large number. Every time the processes of Steps S5 through S9 are repeated, the degree of contribution of each input dimension is updated, and the degree of contribution is thereby made to be more reliable. After the determination result in Step S9 has been "Yes", the useful dimension determiner 17 selects input dimensions which are most likely to be useful based on the finally obtained degrees of contribution (Step S10).

Specifically, for example, a predetermined number of input dimensions are selected in descending order of the degrees of contribution updated by the last execution of Step S8. Alternatively, a predetermined number of input dimensions may be selected within a range where the degrees of contribution are equal to or higher than a predetermined lower limit. In the case of determining the weighting factor according to the degree of contribution, it is possible to effectively exclude unnecessary dimensions by multiplying the input values in those dimensions by a weighting factor that is extremely close to zero.

In most cases of the machine learning, a considerable amount of computing time is required if the machine learning is iterated using the entire set of the given training data. A commonly used method for avoiding this problem is to iterate the machine learning while dividing the training data into predefined mini-batch learning units. In such a case, the input dimensions to be invalidated can be determined in each mini-batch learning unit.

In order to evaluate the effect of the previously described technique for the useful dimension selection, the technique has been applied to a set of simulation data, as will be hereinafter described.

In the simulation, a set of normally distributed random numbers (normal random numbers) with the number of dimensions of 1000 (i.e. with 1000 peaks) was used as the training data X. The assumed task was to solve a discrimination problem which yields a value of "true" if the variable Y given by the following equation (1) has a negative value or "false" if the variable Y has a non-negative value. The number of sets of training data used for constructing the learning model was 90,000. Additionally, 10,000 sets of evaluation data were prepared for the evaluation of the learning model.

$$Y=(X[10]+0.5)\cdot(X[20]-0.4)\cdot(X[30]-0.3)\cdot(X[40]+0.2)\cdot(X[50]-0.1)\cdot X[60] \quad (1)$$

The 90,000 sets of training data were divided into mini-batch learning units each of which included 1000 sets of data. The 90,000 sets of training data were entirely processed by iterating a sequence of processes 90 times, with one mini-batch learning unit processed each time. The 90-time iteration was defined as one learning epoch. The iteration of the processes was performed over approximately 400 epochs.

Figure 2:
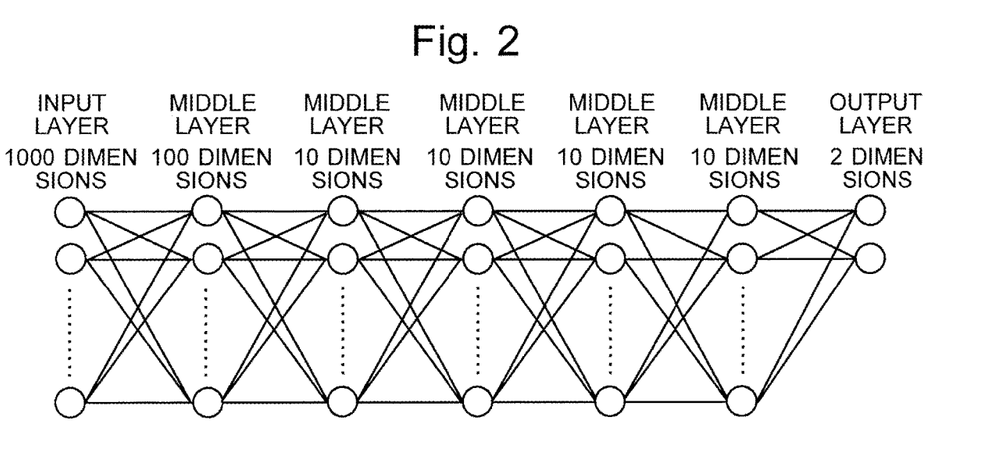
FIG. 2 is a model diagram showing one example of the fully connected neural network.

In the simulation, the fully connected neural network shown in FIG. 2 was used as the technique of the machine learning, using an elu function as the activation function and a softmax function as the discrimination function. The discrimination problem mentioned earlier was solved by two methods: a method according to the present invention which includes the previously described useful dimension selection process (Method A) and a method described in Non Patent Literature 1 (Method B). The degree of contribution of each input dimension and the percentage of the correct responses per learning epoch were determined.

Figure 5:
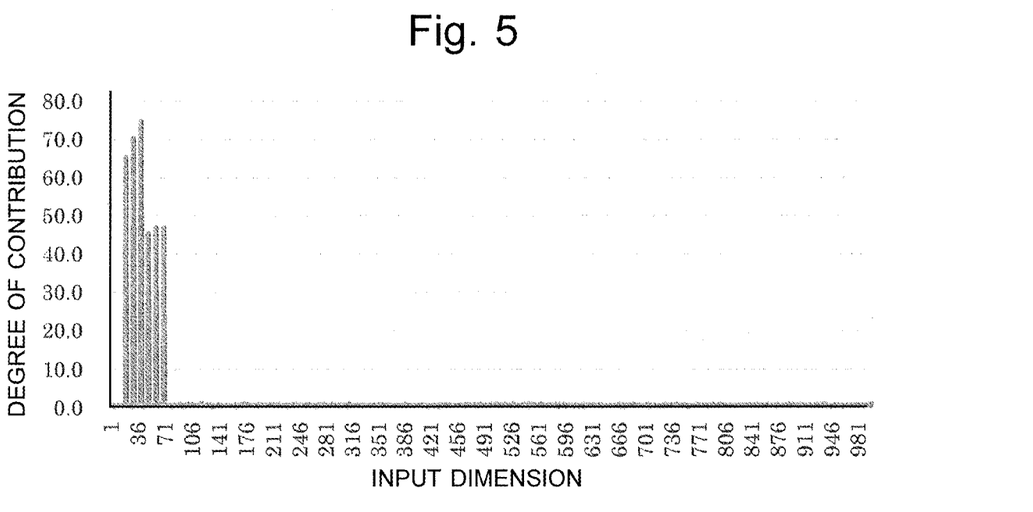
FIG. 5 is a chart showing one example of the result of the calculation of the degree of usefulness of each input dimension in the case where the technique according to the present invention was used.
Figure 6:
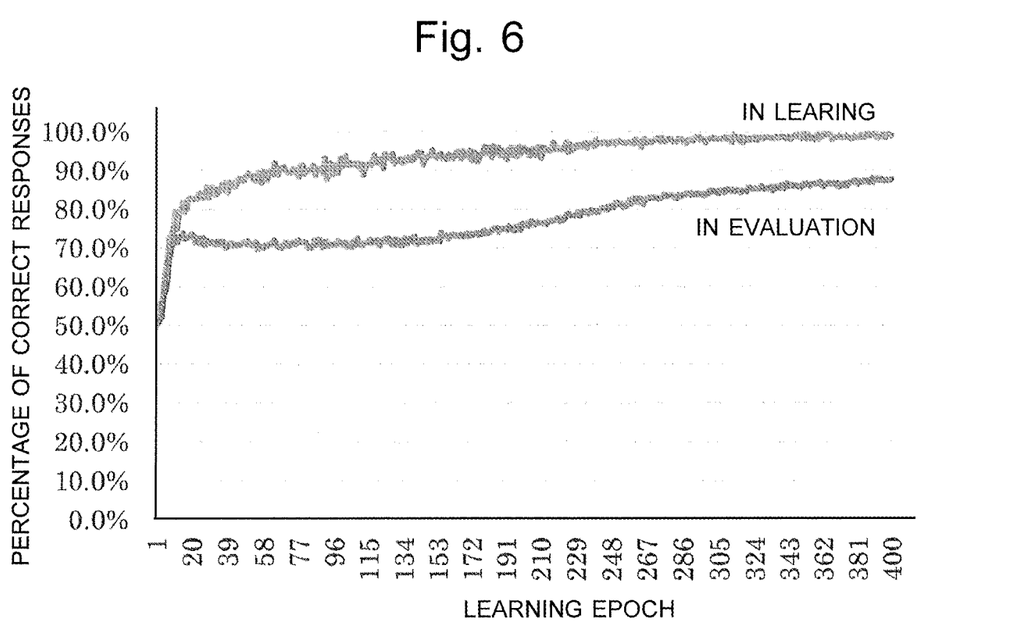
FIG. 6 is a chart showing one example of the percentage of the correct responses in each learning epoch in the learning process as well as the evaluation process in the case where the technique according to the present invention was used.
Figure 7:
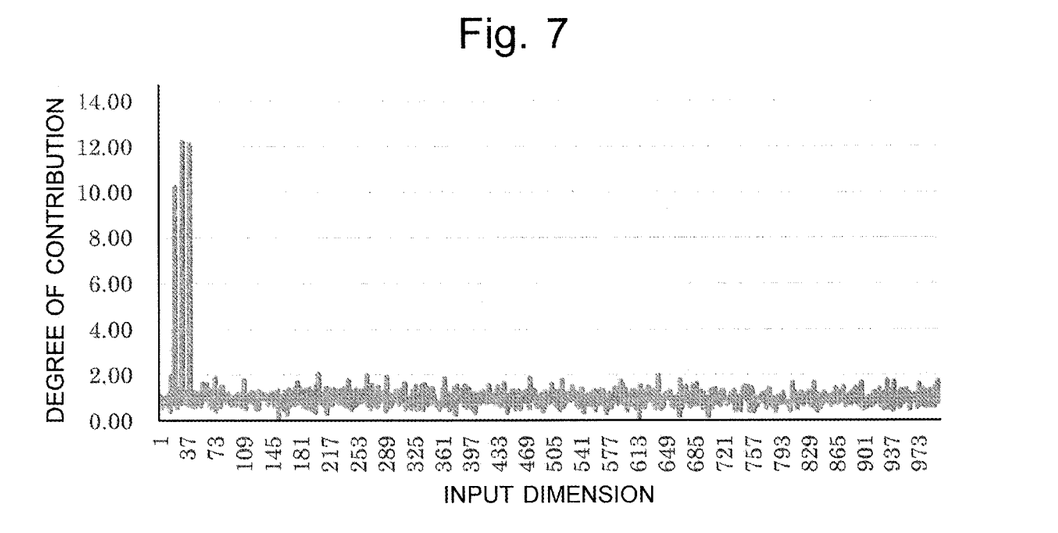
FIG. 7 is a chart showing one example of the result of the calculation of the degree of usefulness of each input dimension in the case where a conventional technique was used.
Figure 8:
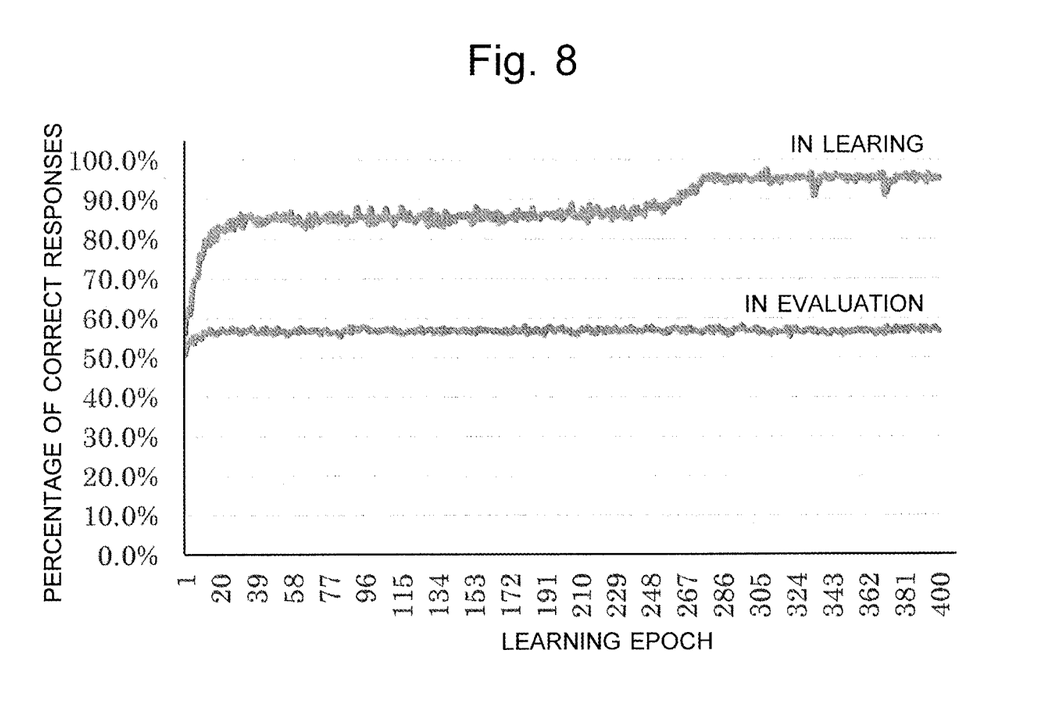
FIG. 8 is a chart showing one example of the percentage of the correct responses in each learning epoch in the learning process as well as the evaluation process in the case where a conventional technique was used.

FIG. 5 is a chart showing the degree of contribution of each input dimension obtained in the case where Method A was used. FIG. 6 is a chart showing the percentage of the correct responses in each learning epoch obtained in the case where Method A was used. FIG. 7 is a chart showing the degree of contribution of each input dimension obtained in the case where Method B was used. FIG. 8 is a chart showing the percentage of the correct responses in each learning epoch obtained in the case where Method B was used.

The number of key dimensions used in equation (1) is 6, while FIG. 5 shows noticeably high degrees of contribution in six dimensions. This means that the key dimensions were correctly extracted by Method A. By comparison, in FIG. 7, there are only three dimensions clearly extracted, which means that some of the key dimensions were not correctly extracted. A comparison of FIGS. 6 and 8 demonstrates that Method A yielded considerably higher percentages of the correct responses in the evaluation process than Method B. Additionally, Method A had a smaller difference between the percentage of the correct responses in the learning process and that of the correct responses in the evaluation process. The smaller this difference is, the smaller the effect of the overtraining is. Accordingly, the result confirms that the overtraining was avoided in Method A, so that the machine-learning model could exhibit a higher discrimination performance.

In the present example, it is preferable to perform the iteration of the processes over 200 epochs or more in order to obtain a sufficiently high level of discrimination performance.

In the previous embodiment, a neural network is used as the technique of the machine learning. It is evident that various other techniques may also be used, such as a support vector machine, random forest or non-linear discrimination. What kind of technique is suitable for use depends on the nature of the analysis data to be analyzed as well as other factors. Accordingly, it is preferable to prepare a plurality of machine-learning techniques and allow users to appropriately select one of them. Additionally, it is commonly known that two or more models of the same kind, or two or more different kinds of models, can be combined in a discrimination analysis or regression analysis by machine learning. Therefore, it is evident that such a combination can also be used in the present invention.

In the data analyzing unit of the disease discrimination device in the previous embodiment, the present invention is applied for an analysis of mass spectrum data obtained with a mass spectrometer. It is evident that the present invention is generally applicable in any device which performs a discrimination analysis or regression analysis using the technique of machine learning for various other kinds of analysis data. For example, the present invention can be applied in a device for analyzing chromatogram data obtained with a LC or GC system, absorption spectrum data obtained with a spectrophotometer, or X-ray spectrum data obtained with a fluorescent X-ray analyzer.

It should be noted that the previous embodiment is a mere example of the present invention, and any change, modification, addition or the like appropriately made within the spirit of the present invention in any respect other than those already described will naturally fall within the scope of claims of the present application.

REFERENCE SIGNS LIST

1 . . . Data Analyzing Unit
10 . . . Useful Dimension Selection Processor
11 . . . Data Reader
12 . . . Machine Learning Executer
13 . . . Usefulness Degree Calculator
14 . . . Input Dimension Invalidator
15 . . . Usefulness Degree Updater
16 . . . Iteration Process Controller 17 . . . Useful Dimension Determiner
18 . . . Machine-Learning Model Creator
19 . . . Unknown Data Discriminator
2 . . . Operation Unit
3 . . . Display Unit

The invention claimed is:

1. An analysis-data analyzing device for analyzing multidimensional analysis data obtained for a plurality of samples by an analyzing apparatus and showing a signal value in each of a plurality of different dimensions, the analysis-data analyzing device being configured to construct a machine-learning model based on training data which are analysis data for a plurality of samples, the analysis-data analyzing device comprising at least one processor configured to:
   a) perform machine learning for a given set of training data to create a machine-learning model for a discrimination analysis or regression analysis;
   b) calculate a degree of usefulness of each dimension of an input in the machine-learning model, or update the degree of usefulness using a newly determined degree of usefulness if the degree of usefulness already exists;
   c) stochastically invalidate a portion of each dimension of the input according to the degree of usefulness;
   d) execute, one or more times, a sequential operation of performing the machine learning using the training data after an invalidation of the portion of each dimension of the input, and then update the degree of usefulness based on a result of the machine learning;
   e) select or weigh the dimensions, of the input, to be used in a discrimination analysis or regression analysis on an unknown sample, based on the degree of usefulness after the sequential operation is iterated one or more times; and
   f) perform the discrimination analysis or regression analysis on the unknown sample using the machine-learning model;
   wherein the at least one processor invalidates a portion of each dimension of the input by judging the index value which indicates the degree of usefulness, with reference to a threshold value stochastically determined based on a probability distribution function of the index value.

2. The analysis-data analyzing device according to claim 1, wherein the probability distribution function is a Gaussian distribution function.

3. The analysis-data analyzing device according to claim 1, wherein the at least one processor invalidates a portion of each dimension of the input by effectively setting the input to zero.

4. The analysis-data analyzing device according to claim 1, wherein the at least one processor calculates a degree of contribution indicating the degree of usefulness, based on a partial differential value of each dimension in relation to a non-linear function for a discrimination analysis or regression analysis calculated as the machine-learning model.

5. An analysis-data analyzing method for analyzing multidimensional analysis data obtained for a plurality of samples by an analyzing apparatus and showing a signal value in each of a plurality of different dimensions, the analysis-data analyzing method configured to construct a machine-learning model based on training data which are analysis data for a plurality of samples, the analysis-data analyzing method comprising:
   a) a model creation step, in which machine learning for a given set of training data is performed to create a machine-learning model for a discrimination analysis or regression analysis;
   b) a usefulness degree calculation step, in which a degree of usefulness of each dimension of an input in the machine-learning model created in the model creation step is calculated, and the degree of usefulness is updated using a newly determined degree of usefulness if the degree of usefulness already exists;
   c) an input invalidation step, in which a portion of each dimension of the input is stochastically invalidated according to the degree of usefulness calculated in the usefulness degree calculation step; and
   d) an analysis step, in which the discrimination analysis or regression analysis is performed on an unknown sample using the machine-learning model,
   wherein a sequential operation of performing once more the machine learning in the model creating step using the training data after an invalidation of the portion of each dimension of the input in the input invalidation step, and then updating the degree of usefulness based on a result of the machine learning, is iterated one or more times, and subsequently, each dimension, of the input, to be used in the discrimination analysis or regression analysis on the unknown sample are selected or weighted based on the degree of usefulness obtained through an iteration of the sequential operation;
   wherein a portion of each dimension of the input is invalidated by judging the index value which indicates the degree of usefulness, with reference to a threshold value stochastically determined based on a probability distribution function of the index value.

* * * * *